(12) United States Patent
Bresser et al.

(10) Patent No.: US 12,461,181 B2
(45) Date of Patent: Nov. 4, 2025

(54) CALIBRATION UNIT AND CALIBRATION SYSTEM

(71) Applicant: Rohde & Schwarz GmbH & Co. KG, Munich (DE)

(72) Inventors: Gerd Bresser, Munich (DE); Thomas Schouwink, Zorneding (DE); Maximilian Friesinger, Munich (DE); Jakob Hammer, Adelshofen (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 210 days.

(21) Appl. No.: 18/451,233

(22) Filed: Aug. 17, 2023

(65) Prior Publication Data

US 2024/0192300 A1 Jun. 13, 2024

(30) Foreign Application Priority Data

Dec. 8, 2022 (EP) ................... 22 212 122.0

(51) Int. Cl.
*G01R 35/00* (2006.01)
*G01R 27/32* (2006.01)

(52) U.S. Cl.
CPC ........... *G01R 35/005* (2013.01); *G01R 27/32* (2013.01)

(58) Field of Classification Search
CPC .............................. G01R 35/005; G01R 27/32
See application file for complete search history.

(56) References Cited

U.S. PATENT DOCUMENTS

| | | | |
|---|---|---|---|
| 5,578,932 A | 11/1996 | Adamian | |
| 6,965,241 B1 | 11/2005 | Liu et al. | |
| 7,030,625 B1 | 4/2006 | Boudiaf et al. | |
| 7,034,548 B2 | 4/2006 | Anderson | |
| 10,794,837 B2 | 10/2020 | Ziegler | |
| 2005/0140377 A1* | 6/2005 | Komatsu | G01R 35/005 324/606 |

(Continued)

FOREIGN PATENT DOCUMENTS

EP 3232218 A2 * 10/2017 ............. G01R 27/28

OTHER PUBLICATIONS

Technical Information: "Calibration Units, R&S ZV-Z58, R&S ZV-Z59"; Rohde & Schwarz Test and Measurement Division; Dec. 31, 2018, pp. 1-19.

(Continued)

*Primary Examiner* — Alesa Allgood
(74) *Attorney, Agent, or Firm* — Studebaker Brackett PLLC

(57) ABSTRACT

A calibration unit comprises a first port which is arranged for being connected to a measurement device; a calibration module comprising at least three different calibration standards for calibrating the measurement device; and a switching module configured to connect the first port with one of the at least three different calibration standards of the calibration module. A daisy chain port is arranged for being connected to a further calibration unit, to an external power meter, or to a device-under-test, DUT. The first port is connectable to the daisy chain port. An internal power meter is arranged within a housing of the calibration unit. The first port is connectable to the internal power meter; or an internal impedance tuner. The first port is connectable to the internal impedance tuner.

18 Claims, 11 Drawing Sheets

(56) References Cited

U.S. PATENT DOCUMENTS

2014/0354294 A1* 12/2014 Boudiaf ................. G01R 35/00
　　　　　　　　　　　　　　　　　　　　　　　333/32
2022/0311522 A1　　9/2022　Friesinger et al.

OTHER PUBLICATIONS

Extended European Search Report issued in EP 22212122.0-1001 by the European Patent Office on May 26, 2023.

* cited by examiner

CALIBRATION UNIT AND CALIBRATION SYSTEM

TECHNICAL FIELD OF THE INVENTION

The invention relates to a calibration unit for calibrating a measurement device, such as a vector network analyzer, and to a calibration system.

BACKGROUND OF THE INVENTION

In a production environment, different measurements are carried out to verify the performance of a newly produced device-under-test (DUT), e.g., a communication device. Thereby, for instance, S-parameters (scattering parameters) of the DUT are characterized. Furthermore, power related measurements can be added to the measurement procedures, e.g., for intermodulation distortion (IMD) measurements. These measurements can be performed by a suitable measurement device, such as a vector network analyzer (VNA).

To ensure maximum measurement accuracy of these measurements, regular calibration cycles are carried out with the measurement device in order to remove or mitigate possible measurement errors.

Depending on the type of measurements performed with the measurement device, different calibration routines are performed which may require connecting different calibration devices to the measurement device. For example, for regular system error correction of linear (power independent) measurements, like S-parameter measurements, a conventional calibration unit is attached to the measurement device, while for a source power calibration, a power meter is attached. A calibration routine of a (modular) multiport VNA, for instance, comprises a complete system error correction of the VNA for S-parameter, noise figure and other non-linear measurements. Thereby, defined power levels, which are provided by the VNA, should be calibrated. DUTs are often non-linear, such that a precise input level at the DUT should be known.

However, each attaching and detaching of cables and of different calibration devices to the measurement device during such a calibration routine is time consuming and, therefore, can increase the costs of testing for the manufacturer. Also each manual attaching and detaching of cables is error prone by the operator, who might attach the cable insufficiently.

Presently, calibration units for calibrating measurement devices typically have up to 8 ports. The higher the number of ports, the more complex the calibration unit. The number of ports of a calibration unit cannot be scaled up for future usage with an increased number of ports after a user has decided to acquire a specific unit with a fixed number of ports. However, measurement requirements in a production or lab environment may constantly change. While a 2-port calibration unit might be sufficient for a conventional S-parameter measurement, a 4-port calibration unit could be required for a differential S-parameter measurement. Thus, a user often acquires calibration units with a larger number of ports, to cover all possible measurement scenarios, even if a less complex calibration unit with a lower number of ports would currently be sufficient.

SUMMARY OF THE INVENTION

Thus, it is an objective to provide an improved calibration unit and an improved calibration system for calibrating a measurement device. In particular, the above-mentioned disadvantages should be avoided.

The objective is achieved by the solution provided in the enclosed independent claims. Advantageous implementations of the present invention are further defined in the dependent claims.

According to a first aspect, the invention relates to a calibration unit for calibrating a measurement device, such as a network analyzer, comprising: a first port which is arranged for being connected to the measurement device; a calibration module comprising at least three different calibration standards for calibrating the measurement device; and a switching module configured to connect the first port with one of the at least three different calibration standards of the calibration module. The calibration unit further comprises at least one of: a) a daisy chain port which is arranged for being connected to a further calibration unit, to an external power meter, or to a device-under-test, DUT, wherein the first port is connectable to the daisy chain port; b) an internal power meter which is arranged within a housing of the calibration unit, wherein the first port is connectable to the internal power meter; or c) an internal impedance tuner which is arranged within a housing of the calibration unit, wherein the first port is connectable to the internal impedance tuner.

This achieves the advantage that a modular calibration unit is provided which allows performing a plurality of different calibration measurements with the measurement device, without having to change a wiring between the measurement device and the calibration unit and/or or to connect additional calibration devices.

In particular, the calibration unit can comprise two or all three of: the daisy chain port, the internal power meter, and the internal impedance tuner. By connecting the daisy chain port, the internal power meter and/or the internal impedance tuner to the first port, these components can be connected to the measurement device, in particular a port of the measurement device, for performing a calibration measurement.

The switching module can comprise one or more switches or switching stages.

The calibration module can comprise an open, a short and a match calibration standard. Thus, the calibration module can be used for performing an OSM (open, short, match) calibration. The "match" may also be referred to as "load", in which case the OSM calibration is called OSL calibration. The calibration module can comprise additional calibration standards, e.g., different line length.

In particular, the calibration module can comprise a calibration circuit which is configured to provide the at least three calibration standards. Preferably, the calibration circuit can comprise a number of ports, wherein each port is associated to or connected with a different calibration standard. For instance, one port of the calibration circuit is shorted (e.g., set to ground) to form the short calibration standard, another port of the calibration circuit is left open to form the open calibration standard, and a further port of the calibration circuit is connected to a matched load (e.g., 50 ohm) to form the match calibration standard.

The switching module can be configured to selectively connect one of these ports of the calibration module to the first port of the calibration unit and, thus, to a port of the measurement device, e.g. a vector network analyzer (VNA), which is connected to the first port. In this way, a calibration of said measurement device port can be carried out according to the connected calibration standard.

In particular, the switching module can be configured to alternatively connect the first port with one of the different calibration standards of the calibration module.

The internal power meter and/or the internal impedance tuner can be arranged within a housing of the calibration unit, wherein the first port is connectable by means of the switching module with said internal power meter and/or internal impedance tuner.

In particular, if the calibration unit comprises a daisy chain port and a DUT is connected to said daisy chain port, the calibration unit can stay connected between the measurement device (e.g., a VNA) and the DUT. In this case, the calibration unit may act as an "inline" calibration unit.

The DUT can be a communication device, in particular a mobile communication device.

In an embodiment, the switching module is configured to connect the first port to the daisy chain port and/or the internal power meter and/or to the internal impedance tuner. This achieves the advantage that a port of the measurement device which is connected to the first port of the calibration unit can be efficiently and quickly connected to the different elements of the calibration unit without having to change a physical connection or wiring between the devices.

In an embodiment, the switching module comprises n switches and/or switching stages, wherein n is larger or equal to 1, 2, 3, 4, 5, 6, 7, 8, or 9.

In an embodiment, a first switch or a first switching stage of the switching module is configured to connect the first port with one of the at least three different calibration standards of the calibration module; and/or the first switch or the first switching stage is configured to connect the first port to a second switch or a second switching stage of the switching module, wherein the second switch or the second switching stage is configured to establish a connection to the daisy chain port and/or to the internal power meter and/or to the internal impedance tuner.

In particular, the first switch (or first switching stage) can be configured to directly or indirectly connect the first port to the second switch (or second switching stage) for further connection to the daisy chain port and/or the internal power meter and/or the internal impedance tuner. Here, indirectly connect can mean that further switches or switching stages are arranged in-between.

The second switch or second switching stage could also comprise or be connectable to a matched load or an open port. If the first switch or switching stage connects the first port to the calibration module, then the second switch or switching stage could switch to said matched load or open port in order to increase an isolation towards the daisy chain port, the internal power meter and/or the internal impedance tuner.

In an embodiment, the calibration unit comprises a second port which is arranged for being connected to the measurement device or a further measurement device.

The second port can be connected to the same measurement device as the first port or to a different measurement device. For instance, the first port of the calibration unit is connected to a first port of a VNA, and the second port of the calibration unit is connected to a second port of the VNA, or the second port of the calibration unit is connected to a port of another measurement device, e.g. a signal analyzer or signal generator.

In an embodiment, the calibration unit further comprises a further calibration module comprising at least three different calibration standards for calibrating the measurement device or the further measurement device; and the switching module is configured to connect the second port with one of the at least three different calibration standards of the further calibration module.

The at least three different calibration standards of the further calibration module may also comprise open, match and load. In the following, the calibration module and the further calibration module are also referred to as first and second calibration modules. The first and second calibration module can have an essentially identical structure, i.e., comprise the same calibration standards.

In an embodiment, the switching module is configured to connect the first port to the second port thereby establishing a through connection. This through connection can be a pass-through connection for an electrical signal. The through connection can form a through calibration standard.

In particular, the switching module may comprise a first and a second switch or switching stage as well as a third and a fourth switch or switching stage. The through connection is preferably established between the second and the fourth switch or switching stages of the switching module. For instance, the first port is connected to the first switch of the switching module, and the second port is connected to the third switch of the switching module, while the second switch and the fourth switch of the switching module are connected with each other.

In an embodiment, the calibration unit further comprises a switching element and/or at least one attenuator which are arranged along the through connection; wherein the switching element can be used for interrupting the through connection thereby increasing the isolation between the first port and the second port, and/or wherein the at least one attenuator can be used for increasing an attenuation of signals in the through connection thereby increasing the isolation between the first and the second port. This achieves the advantage that an isolation can be increased when the measurement device (s) is/are calibrated by the calibration standards open, short and match on the respective ports 1 and/or 2. In particular, the influence from the respective other port can be minimized.

Here, interrupting the through connection may refer to opening the through connection.

The switching element and/or the attenuator can be operated such that they interrupt the through connection and/or enhance an attenuation in the through connection. The switching element can comprise one or more switches which can be configured to interrupt the through connection when opened.

In an embodiment, the switching module is configured to connect the second port to the daisy chain port, and/or the internal power meter or another internal power meter, and/or the internal impedance tuner or another internal impedance tuner. This achieves the advantage that a port of the (further) measurement device, which is connected to the second port of the calibration unit, can be efficiently and quickly connected to the different elements of the calibration unit without having to change a physical connection or wiring between the devices.

In an embodiment, the calibration unit further comprises: a further daisy chain port which is arranged for being connected to a further calibration unit, an external power meter or a DUT.

In particular, the daisy chain port and the further daisy chain port can be connected to different further calibration units, external power meters or DUTs. In the following, the daisy chain port and the further daisy chain port are also referred to as first and second daisy chain port. The DUT connected to the second daisy chain port can be different or identical to a DUT that is connected to the first daisy chain port.

In an embodiment, the switching module is configured to connect the daisy chain port to the further daisy chain port. This achieves the advantage that a through connection can be formed between the daisy chain ports.

In an embodiment, the switching module is configured to connect the first port and/or the second port to the further daisy chain port.

In an embodiment, the internal impedance tuner comprises an electrical line structure and a plurality of switches, especially in the form of transistors, which are arranged at different position along the electrical line structure; wherein each switch is configured to connect the respective position of the electrical line structure to ground in order to tune the internal impedance tuner to a specific impedance; wherein a matched load is arranged at one end of the line structure.

The internal impedance tuner can, thus, provide specific impedances to the measurement device, if the measurement device is connected to the internal impedance tuner via the first port.

An internal impedance tuner can be added to the calibration unit for each port (i.e., for the first and for the second port). The line structure can be a signal line on a printed circuit board (PCB). The transistors can be used to divide the line structure into segments of different lengths depending on which transistor is enabled. One match, for instance 50 Ohm, can be arranged at the end of the electrical line structure to avoid any reflections of a signal if none of the transistors is enabled. The impedance tuner can be highly reflective. In particular, the matched load is arranged on an end of the line structure that is opposite to the end that his connected to the first port.

In an embodiment, the calibration unit further comprises a first data connection port which is arranged to establish a data connection between the calibration unit and the measurement device; wherein the switching module is controllable through the data connection, and/or the impedance tuner is controllable through the data connection, and/or measurement data of the internal power meter is transmitted via the data connection to the measurement device.

Furthermore, calibration data of the calibration unit can be transmitted from the calibration unit to the measurement device via the first data connection port. As such, the calibration unit can comprise a processing unit and/or a memory unit which are configured to generate and/or transmit the calibration data.

In an embodiment, the calibration unit further comprises at least a second data connection port which is configured to daisy-chain the data connection to at least a further calibration unit.

For instance, if several calibration units are jointly operated, the switching module of all calibration units can be connected to a single data bus via the daisy-chained data connection. Thus, all switching modules can be controllable through one data connection.

The first and/or second data connection port can be a USB port.

In an embodiment, the second data connection port is arranged on the housing of the calibration unit, such that a physical connection with a respective data connection port of the further calibration unit is established if the calibration unit and the further calibration unit are stacked on top of each other.

This achieves the advantage that a cable free connection between two calibration units can be established. For instance, the respective data connection ports on both calibration units comprise complementary plug or bayonet connectors.

Alternatively, the data connection between two calibration units can be a wireless connection. Also, the data connection between the calibration unit and the measurement device could be a wireless connection. The calibration unit can comprise suitable wireless communication interfaces for establishing such wireless connections with further devices.

In an embodiment, the calibration unit is configured to receive a power supply via the first data connection port or via a separate power connector of the calibration unit.

If the power supply is provided through the data connection, only one cable can be used for both power supply and data communication.

In an embodiment, the calibration unit further comprises a plurality of indicators, which are configured: to indicate which device or cable should be connected to at least one port of the calibration unit, and/or to indicate a number or a position of the calibration unit in a system comprising a plurality of calibration units.

For instance, each indicator can be adapted to indicate how the wiring should be arranged. The indicators can display which port of the calibration unit should be connected next and to which device or object (e.g., other port, DUT, power meter). The indicators can comprise LEDs on the housing of the calibration unit. This achieves the advantage that a user knows where to attach a cable so that an incorrect wiring can be prevented.

In an embodiment, the calibration unit comprises at least one fastening connection for connecting the calibration unit to a further calibration unit. This achieves the advantage that a connection between calibration units can be established in a tool free manner, e.g., by sliding/clicking in the fastening connection.

For instance, the calibration units can be stacked horizontally or vertically and connected to each other via respective fastening connections of each unit.

According to a second aspect, the invention relates to a calibration system. The calibration system comprises a plurality of calibration units according to the first aspect of the invention; wherein each of the plurality of calibration units comprises two daisy chain ports; wherein the calibration units (of the plurality of calibration units) are connected to each other in a serial manner via the respective daisy chain ports; and wherein the calibration units (of the plurality of calibration units) are stacked horizontally or vertically and/or are arranged in a common enclosure.

For instance, the plurality of calibration units can be stacked on top of each other.

The two daisy chain ports of each calibration unit of the system can be the daisy chain port and the further daisy chain port (i.e., the first and the second daisy chain port) as described above.

In an embodiment, if the plurality of calibration units is arranged in a common enclosure, the system comprises a backplane which is connected to the plurality of calibration units and which is configured to provide a power supply to each of the plurality of calibration units.

The backplane can be arranged in or attached to the common enclosure, e.g., at a side surface of the common enclosure.

The system can comprise a compound or network of several calibration units which are stacked and/or arranged in a common enclosure. Thereby, the calibration devices can be daisy chained via the respective daisy chain ports and/or data connection ports of the units. These daisy chain ports and/or data connection ports can be arranged on a backside of the calibration units while the first and/or second ports (for connecting the measurement device ports) can be arranged on a front side of the calibration units of the system. In particular, when the calibration units are stacked and/or inserted in the common enclosure, all connections to the measurement device (VNA) (in particular, first and second port of the calibration units) can be arranged on a front side of the system so that these ports are accessible to a user.

In particular, daisy the chain connection between the calibrations units of the system can be established through cables (flexible) or metal clamps (stiff). The daisy chain connection is preferably established after the calibration units are inserted into the common enclosure (e.g., housing) of the system through the rear site (e.g., by a common backplane). A data connection between the calibration units can be automatically established when the calibration units are stacked upon each other or through the backplane after they have been insertion in the common enclosure.

The above description with regard to the calibration unit according to the first aspect of the invention is correspondingly valid for the calibration system according to the second aspect of the invention.

BRIEF DESCRIPTION OF THE DRAWINGS

The invention will be explained in the following together with the figures.

DETAILED DESCRIPTION OF THE PREFERRED EMBODIMENTS

Figure 1:
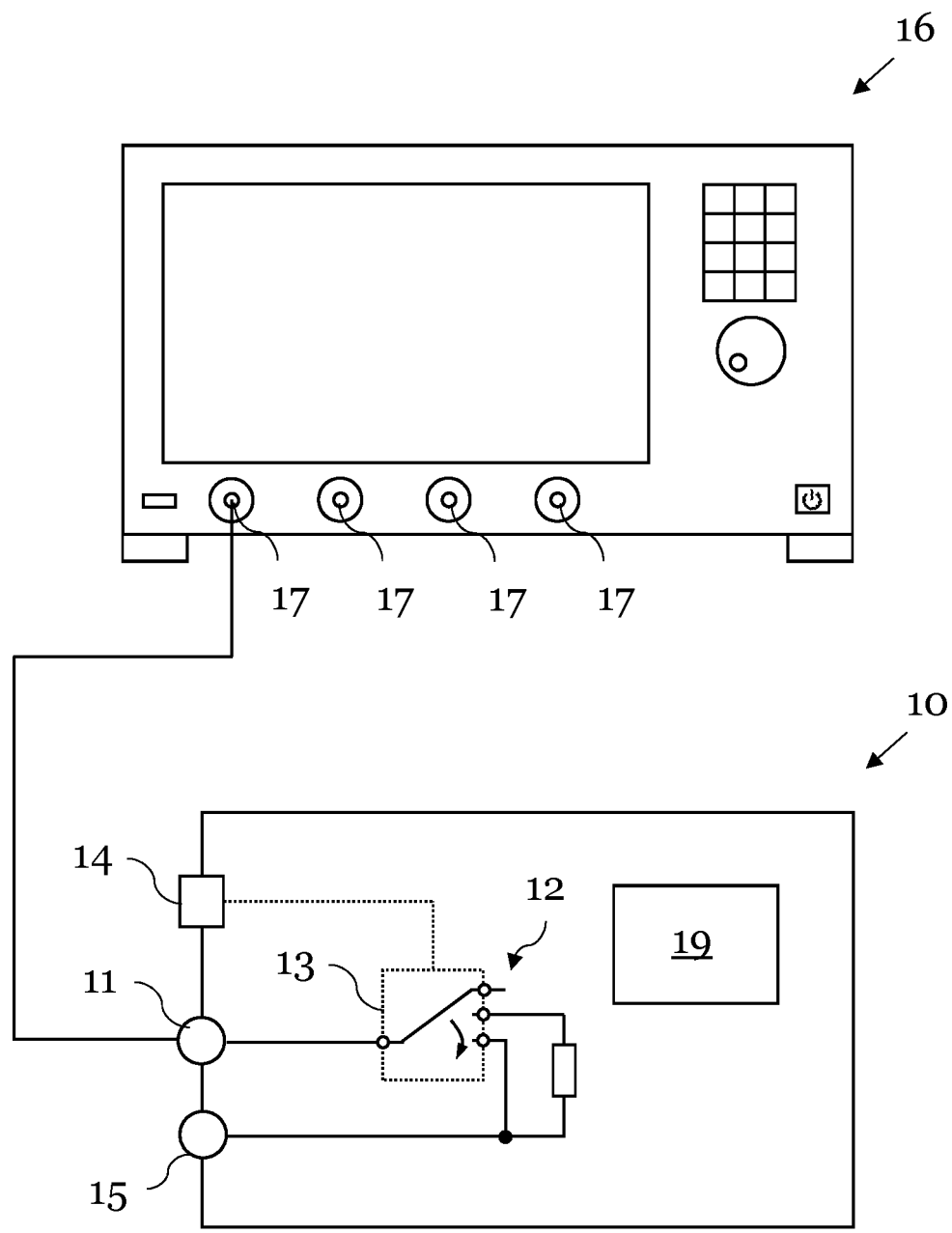
FIG. 1 shows a schematic diagram of a calibration unit which is connected to a measurement device according to an embodiment.

FIG. 1 shows a schematic diagram of a calibration unit 10 for calibrating a measurement device 16.

The calibration unit 10 comprises a first port 11 which is arranged for being connected to the measurement device 16, a calibration module 12 comprising at least three different calibration standards for calibrating the measurement device, and a switching module 13 configured to connect the first port 11 with one of the at least three different calibration standards of the calibration module 12.

The calibration unit 10 further comprises one or more additional elements 19 which are connectable to the first port 11. These one or more additional elements 19 comprise: an internal power meter and/or an internal impedance tuner and/or a daisy chain port. Thereby, the internal power meter and/or the internal impedance tuner are arranged in a housing of the calibration unit 10. The daisy chain port is a port of the calibration unit 10 which is arranged for being connected to a further calibration unit, to an external power meter, or to a DUT.

Preferably, the switching module 13 (also referred to as switching unit) is configured to connect the first port 11 to the daisy chain port and/or the internal power meter and/or to the internal impedance tuner. The first port 11 can be an input port of the calibration unit 10. The calibration unit 10 can further comprise a ground port 15.

When the calibration unit 10 is connected to the measurement device 16 via a cable, e.g. a coaxial cable, the first (input) port 11 can be connected to the center conductor of the cable and the ground port 15 can be connected to the outer conductor (shield) of the cable. Thus, the calibration unit can comprise a coaxial connector socket (or RF connector socket) which comprises the first port 11 and the ground port 15. The measurement device 16 may comprise one or more complementary coaxial connector sockets which comprise ports 17 of the measurement device.

The switching module 13 can comprise one or more switches and/or switching stages. For instance, the switching module 13 comprises n switches, wherein n is larger or equal to 1, 2, 3, 4, 5, 6, 7, 8, or 9. Most or all switches or switching stages within the calibration unit 10 may be part of the switching module 13. The switches or switching stages of the switching module 13 can be semiconductor switches or relays. Preferably, the switches or switching stages of the switching module 13 can be switched electronically.

The first port 11 can be connected to a port 17 of the measurement device 16. For instance, the measurement device is a vector network analyzer (VNA). By means of the switching module 13 the first port 11 is connected to the calibration module 12 which can comprise respectively form an OSM calibration standard (i.e., the calibration standards open, short and match). The switching module can selectively connect the first port 11 (and thus the measurement device 16) to the individual calibration standards to perform a calibration or system error correction.

In particular, a calibration or system error correction is the process of eliminating systematic, reproducible errors from the measurement results (e.g., S-parameters and derived quantities). A typical calibration process involves the following steps: i) a set of calibration standards can be selected and measured over a certain (frequency) sweep range. For many calibration types, the magnitude and phase response of each calibration standard (i.e., its S-parameters if no system errors occur) is preferably known within the entire sweep range. In some calibration procedures (TRL, TNA, TRM), a part of the characteristics of the standards can be auto-determined due to implicit redundancy (self-calibration). ii) An analyzer can compare the measurement data of the standards with their known, ideal response. The difference can be used to calculate a system error using a particular error model (calibration type) and derive a set of system error correction data. iii) The system error correction data can, then, be used to correct the measurement results of a DUT that is measured instead of the standards. The calibration is typically channel-specific, since it depends on the hardware settings, in particular on the sweep range. This means that a system error correction data set can be stored with each calibrated channel.

In particular, the calibration unit 10 enables an automatic calibration of several network analyzer ports 17 in one simple procedure or routine. It contains calibration standards that can be switched electronically by an analyzer firmware when a calibration is performed. The characteristic data of the standards can be stored in the calibration unit 10, so that the analyzer can calculate the error terms and apply the calibration without any further input. The analyzer can be a component of the measurement device 16, the calibration unit 10, or a further external device.

In particular, the calibration module 12 of the calibration unit 10 in FIG. 1 comprises the three calibration standards open, short and match. The switching module 13, which is formed by a single switch in FIG. 1, can switch between these calibration standards by switching between three switching ports. Thereby, the "open" calibration standard is formed by a port which is left open, i.e. not connected to anything (top switching port in FIG. 1); the "match" calibration standard is formed by a connection to a matched load of, e.g., 50 ohm (middle switching port in FIG. 1); and the "short" calibration standard is formed by a connection to a ground line (bottom switching port in FIG. 1) which is, in turn, connected to the ground port 15.

By means of the switching module 13, the calibration unit 10 can be configured to perform an automatic calibration of the measurement device 16. Such an automatic calibration is generally much faster and less error-prone than a manual calibration. In particular, there is no need to individually connect the different calibration standards manually, which is particularly timesaving if multiple ports are to be calibrated. Furthermore, invalid calibrations due to operator errors (e.g., wrong standards or improper connections) can be avoided, calibration kit data does not have to be handled by an operator, and the internal standards do not wear out because they are switched electronically.

The calibration unit 10 may further comprise a data connection port 14. The data connection port 14 can be arranged to establish a (digital) data connection between the calibration unit 10 and the measurement device 16. For instance, the switching module 13 can be controlled via a data connection that is established by means of the data connection port 14 (e.g., an USB port). In addition or alternatively, the impedance tuner is controllable by means of said data connection, and/or measurement data of the internal power meter is transmitted via the data connection port 14 to the measurement device 16.

In FIGS. 1-14, digital data transmission lines are generally shown in dotted lines and analog data transmission lines for transmitting an RF signal are generally shown in bold lines.

Figure 2:
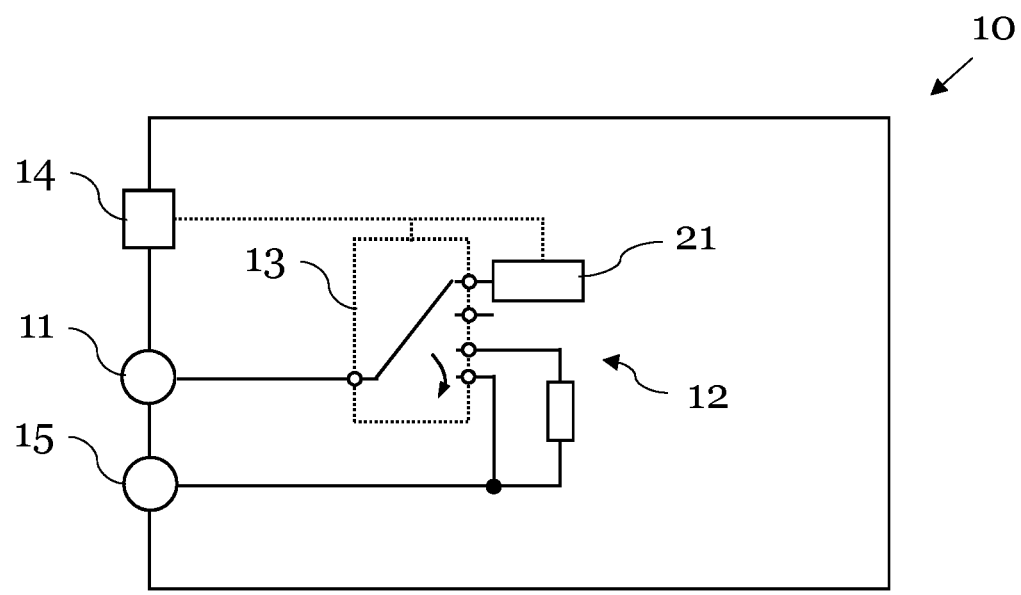
FIG. 2 shows a schematic diagram of a calibration unit according to an embodiment.

FIG. 2 shows a schematic diagram of the calibration unit 10 according to an embodiment. The calibration unit 10 in FIG. 2 comprises the internal power meter 21 as additional element 19.

The internal power meter 21 can be arranged on the same substrate as the OSM calibration standards of the calibration module 12. Measurement data is recorded by the power meter 21 and can be directly digitalized (e.g., by means of an analog-to-digital converter in the calibration unit 10) and then transmitted digitally, in particular via the digital data connection (dotted line), to the measurement device 16. Via this data connection, calibration data of the OSM 1 calibration standards can be transmitted to the measurement device 16 to be calibrated.

The internal power meter 21 can be used to perform a source power calibration of the measurement device 16. For instance, a source power calibration is carried out to ensure accurate power levels of the generated waves at an arbitrary calibration plane in a measurement path. The calibration plane can correspond to the input of a DUT. For instance, in a frequency sweep, the power at the calibration plane is maintained at a constant "Cal Power" value. The source power calibration can eliminate frequency response errors in the signal path between the source and the calibration plane. It is possible to introduce an arbitrary attenuation or gain into the signal path so that the Cal power is not restricted to the power range of the source. A typical application for a power calibration in a frequency sweep is the measurement of the gain of an amplifier across a frequency range at a fixed input power. In a power sweep, the power calibration can ensure that the power at the calibration plane is either constant or a linear function of the stimulus power. The correction data acquired in a frequency or power sweep can be re-used, if a "Time" or "CW Mode" sweep is carried out.

Having the internal power meter 21 integrated in the calibration unit 10 achieves the advantage that no external power meter or power sensor (e.g., connected via GPIB bus, USB or LAN interface) is required for the source power calibration. Thus, no cables need to be replaced or devices reconnected for performing the source power calibration.

Thus, the calibration unit 10 can form a "multi-domain calibration unit" which combines automatic system error correction with source power calibration by integrating a power meter in the unit 10.

The switching module 13 can be configured to selectively connect the first port 11 to said internal power meter 21. For instance, a switch of the switching module 13 comprises an additional switching position that connects the integrated power meter 21 to the first port 11. In this additional switching position, the other calibration standards are inactive (not connected) and a power measurement can be carried out.

Preferably, the integration of the power meter 21 has no negative impact on the existing calibration standards within the calibration unit 10, as the S-parameters of the different calibration standards are kept within the calibration unit 10 and no perfect calibration standards are required.

The integrated power meter 21 could be powered via port 14, e.g. an USB or LAN port.

Figure 3:
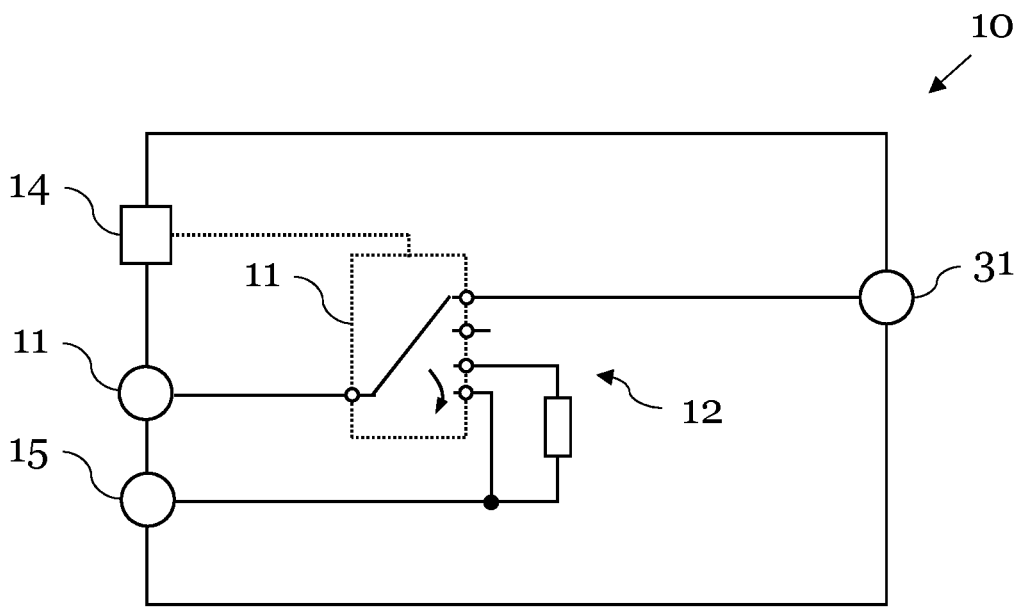
FIG. 3 shows a schematic diagram of a calibration unit according to an embodiment.

FIG. 3 shows a schematic diagram of the calibration unit 10 according to an embodiment. The calibration unit 10 in FIG. 3 comprises daisy chain port 31 as additional element 19. The switching module 13 can be configured to selectively connect the first port 11 to said daisy chain port 31.

The daisy chain port 31 can be an output port for connecting, e.g., an external power meter. In this case, the port 17 of the measurement device 16 can be connected to this external power meter via the calibration unit 10, such that the calibration unit 10 does not need to be disconnected when performing a source power calibration.

For instance, the external power meter can be connected directly at the calibration plane (or to any other point in the test setup).

Figure 4:
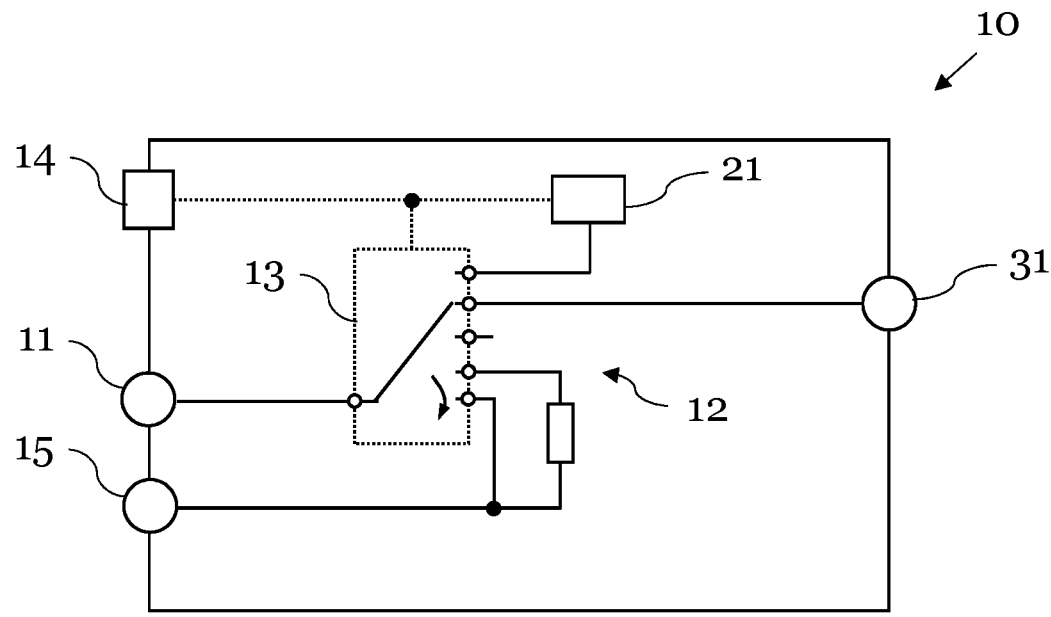
FIG. 4 shows a schematic diagram of a calibration unit according to an embodiment.

FIG. 4 shows a schematic diagram of the calibration unit 10 according to an embodiment. The calibration unit 10 thereby comprises both the internal power meter 21 and the daisy chain port 31.

For instance, a DUT (not shown) can be connected to the daisy chain port 31. The calibration unit can, thus, stay permanently connected between the measurement device 16 and the DUT. No cables need to be replaced or reconnected in case a port 17 of the measurement device 16 is calibrated. Thus, the calibration unit 10 may form an "inline" calibration unit.

Figure 5:
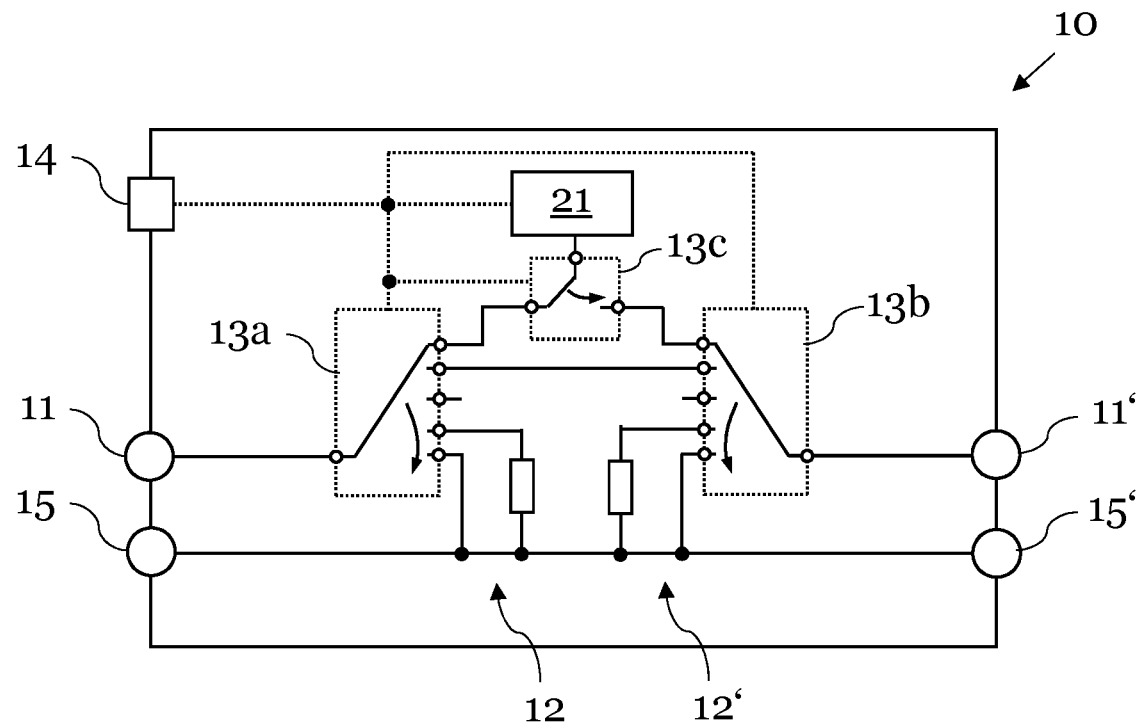
FIG. 5 shows a schematic diagram of a calibration unit according to an embodiment.

FIG. 5 shows a schematic diagram of the calibration unit 10 according to an embodiment. The calibration unit 10 in FIG. 5 comprises a second port 11' and a further calibration module 12'.

The second port 11' can be arranged for being connected to the measurement device 16 or to a further measurement device (or another device).

The further calibration module 12' can be a duplicate of the calibration module 12 (i.e., comprise the same calibration standards). Thus, the calibration unit 10 can comprise two OSM calibration standards. In addition, the calibration modules 12, 12' can comprise a "through" calibration standard (second switching port from the top). When this "through" standard is selected, the first and the second port 11, 11' are connected to each other. The through calibration standard may require a characterization which is, for instance, stored in the calibration unit 10. Alternatively, the through calibration standard can be an "unknown through". Such an "unknown through" can be sufficient for performing an UOSM calibration.

Furthermore, the switching module 13 in FIG. 5 comprises three switches: one switch 13a for connecting the first port 11 to the first calibration module 12, one switch 13b for connecting the second port 11' to the second calibration module 12', and one switch 13c for connecting the internal power meter 21 to the first port 11 or the second port 11'. Thus, the internal power meter 21 can be connected to the first or second port 11, 11' via more than one switch.

Figure 6:
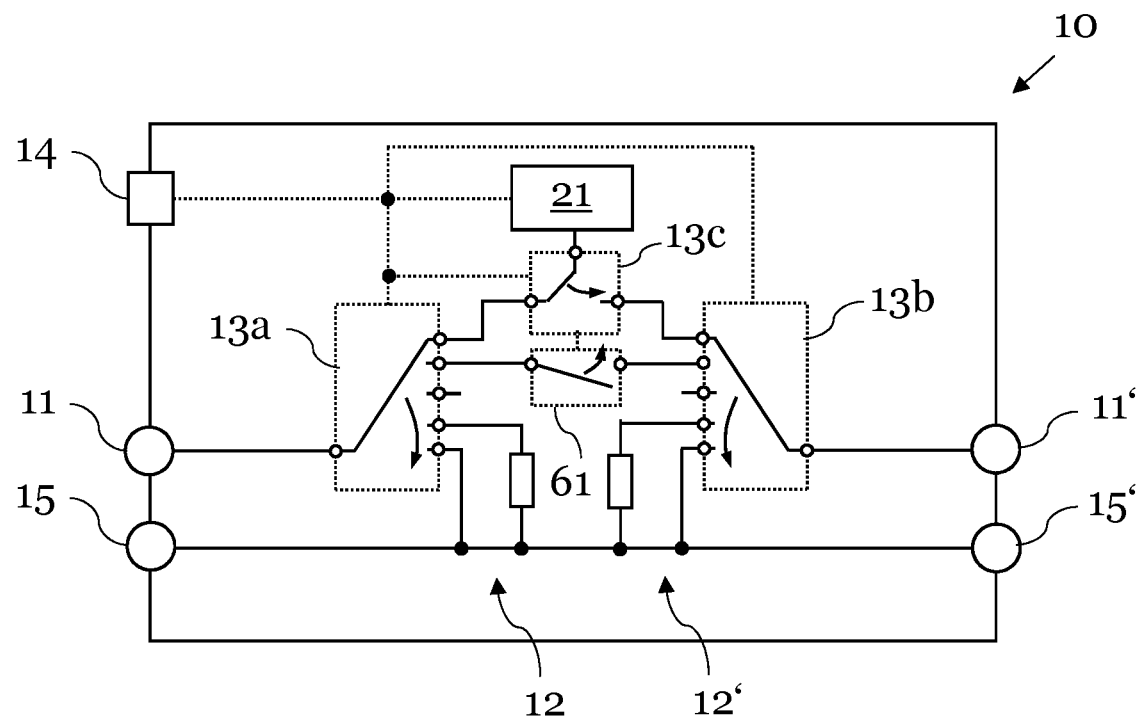
FIG. 6 shows a schematic diagram of a calibration unit according to an embodiment.

FIG. 6 shows a schematic diagram of the calibration unit 10 as shown in FIG. 5, wherein an additional switch 61 of the switching module 13 is arranged in the through connection. In this way, an isolation between the ports 11 and 11' can be enhanced by interrupting respectively opening the through connection by means of the switch 61.

Figure 7:
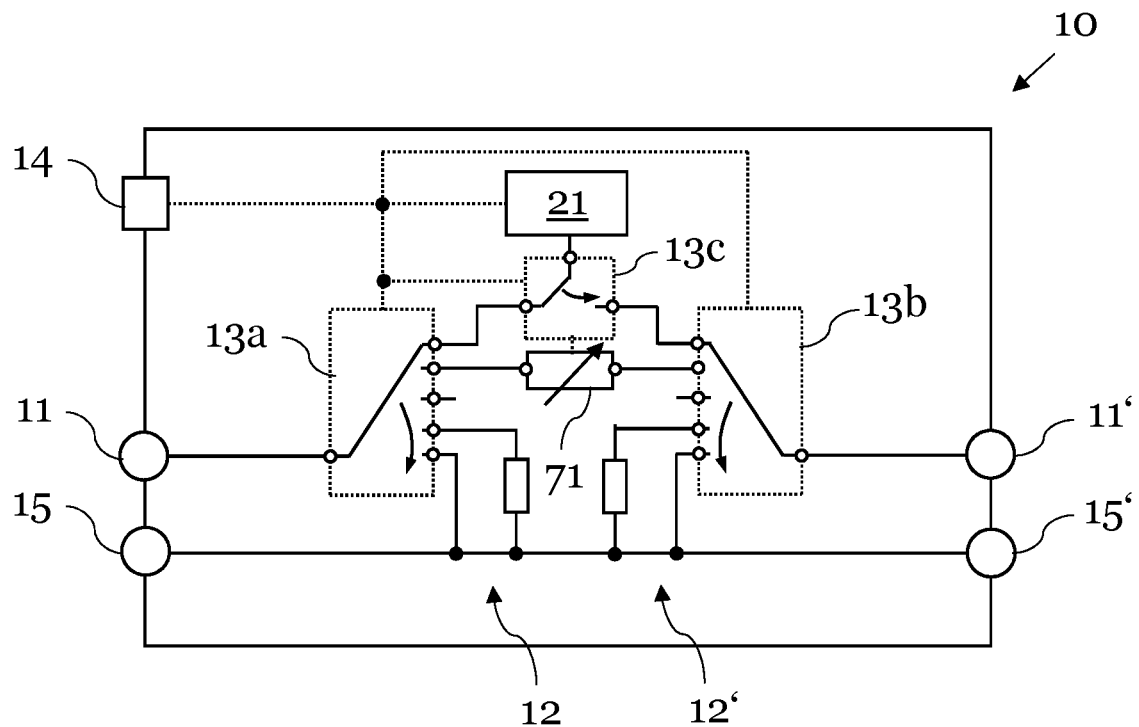
FIG. 7 shows a schematic diagram of a calibration unit according to an embodiment.

FIG. 7 shows an alternative to FIG. 6 where an attenuator 71 is arranged in the through connection. The attenuator 71 can be used to increase an attenuation of signals in the through connection, for example if an OSM calibration is carried out, in order to enhance an isolation between the ports 11, 11'.

It is also possible that both a switch 61 and an attenuator 71 are arranged in or along the through connection.

Figure 8:
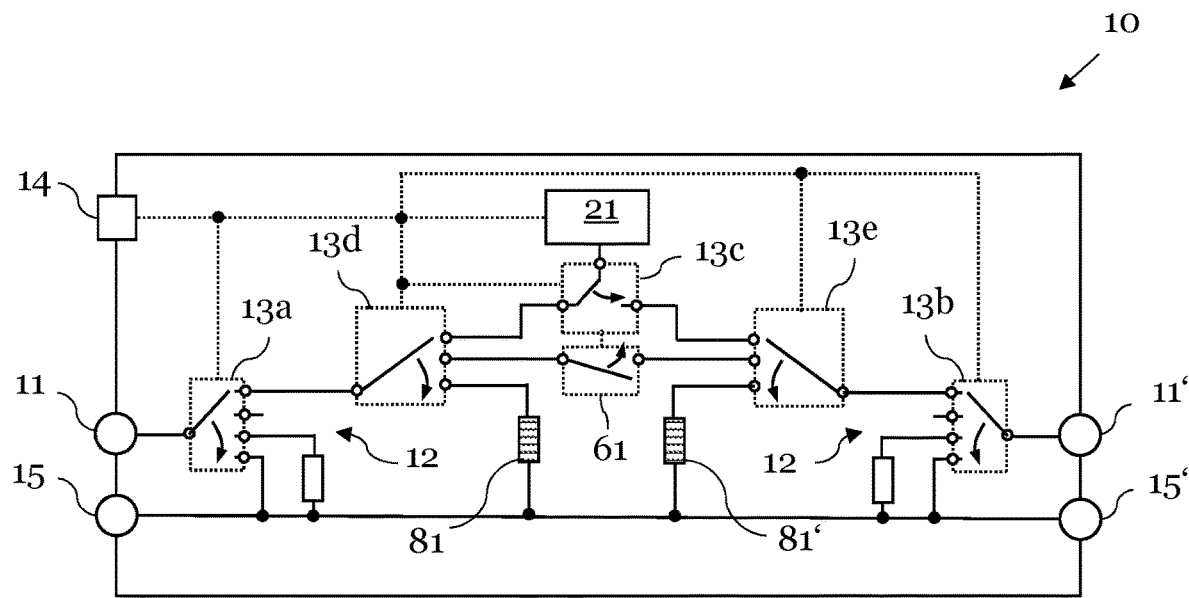
FIG. 8 shows a schematic diagram of a calibration unit according to an embodiment.

FIG. 8 shows a schematic diagram of the calibration unit 10 according to an embodiment. Thereby, the part of the switching module 13 that is connected to each port 11, 11' is designed as a two-stage switch. A respective first switch 13a, 13b is connected between the first/second ports 11, 11' and the OSM calibration standards of the calibration modules 12, 12' and a respective second switch 13d, 13e connects the first switch to the internal power meter 21 and the through connection (with switch 61). Thus, the power meter 21 can be connected to a second switching stage after the OSM calibration standards. Preferably, this allows reducing the influence of the power meter 21 (and the through connection) on the OSM calibration (if the respective second switch 13d, 13e is open). Thus, by means of the additional switching stages, a sufficiently high isolation can be achieved.

The OSM standards of the calibration modules 12, 12' can be arranged in close proximity to the first respectively second port 11, 11'.

Furthermore, the calibration unit 10 in FIG. 8 comprises two internal impedance tuners 81, 81. Each impedance tuner 81, 81' may comprise an electrical line structure and a number of switches (e.g., transistor switches). The impedance tuners 81, 81' can provide different line length of the electrical line structure depending on which switch along the line structure is switched to conduct.

Alternatively, a calibration unit 10 may comprise a single impedance tuner 81, in particular a calibration unit 10 with a single calibration module 12 as shown in any one of FIGS. 1-4.

Figure 9:
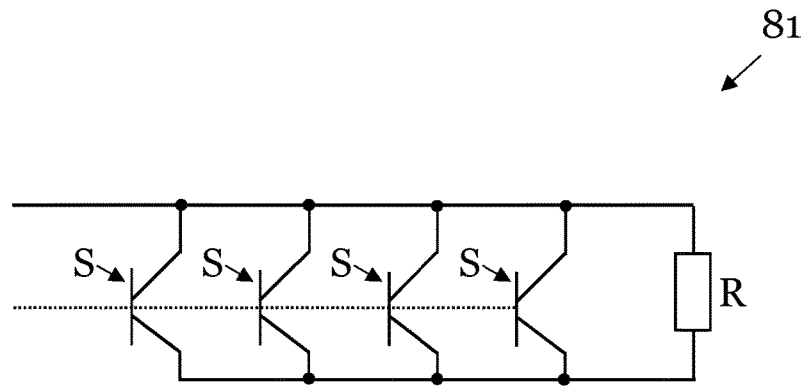
FIG. 9 shows a schematic diagram of an internal impedance tuner according to an embodiment.

FIG. 9 shows a schematic diagram of the impedance tuner 81 according to an embodiment.

In the example shown in FIG. 9, four switches S in the form of transistors are arranged along the line structure. The end of the line is terminated via a terminal resistor R (e.g., 50 ohm).

Each switch S can be configured to connect the respective position of the line structure to ground in order to set a specific impedance of the impedance tuner.

In particular, the impedance tuner 81 can be a high-reflect standard which is terminated on one end by load R.

Figure 10:
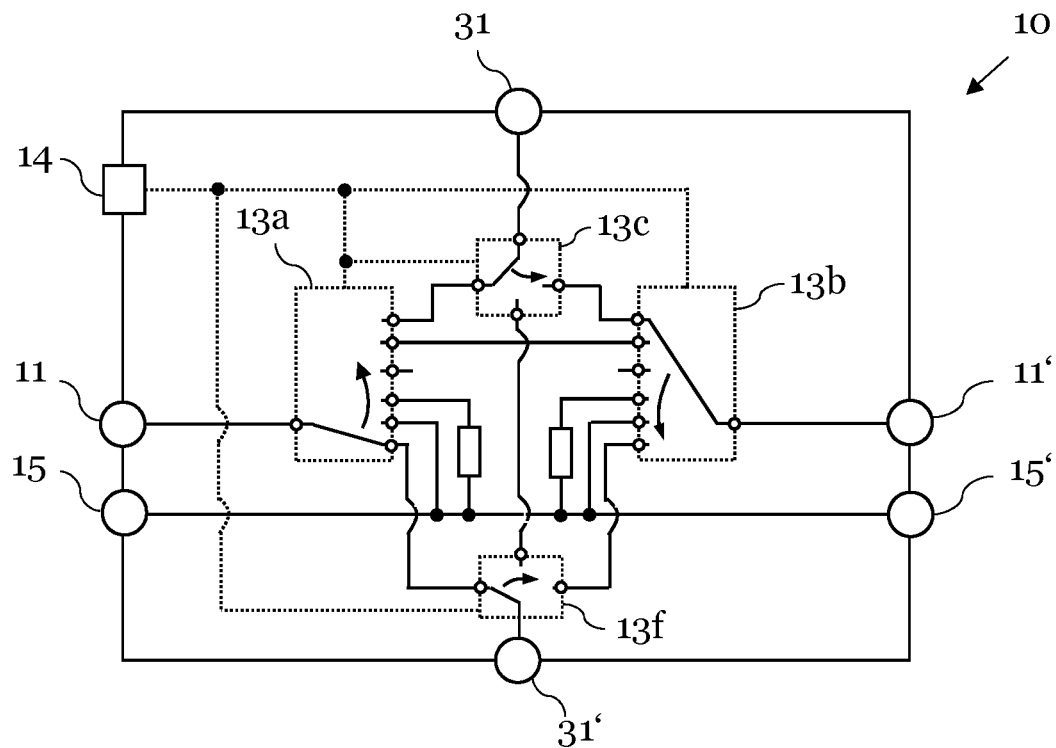
FIG. 10 shows a schematic diagram of a calibration unit according to an embodiment.

FIG. 10 shows a schematic diagram of a calibration unit 10 according to an embodiment. The calibration unit comprises a first daisy chain port 31 and a second daisy chain port 31'.

Via respective switches 13a, 13b, 13c, 13f of the switching module 13, the first port 11 and the second port 11' can both be connected to each of the daisy chain ports 31, 31'. Both the first and the second daisy chain port 31 can thereby be connected to a respective further calibration unit, an external power meter or a DUT.

In particular, the two daisy chain ports 31, 31' can also be connected to each other by means of switches 13c and 13f and a through connection between these switches.

Figure 12:
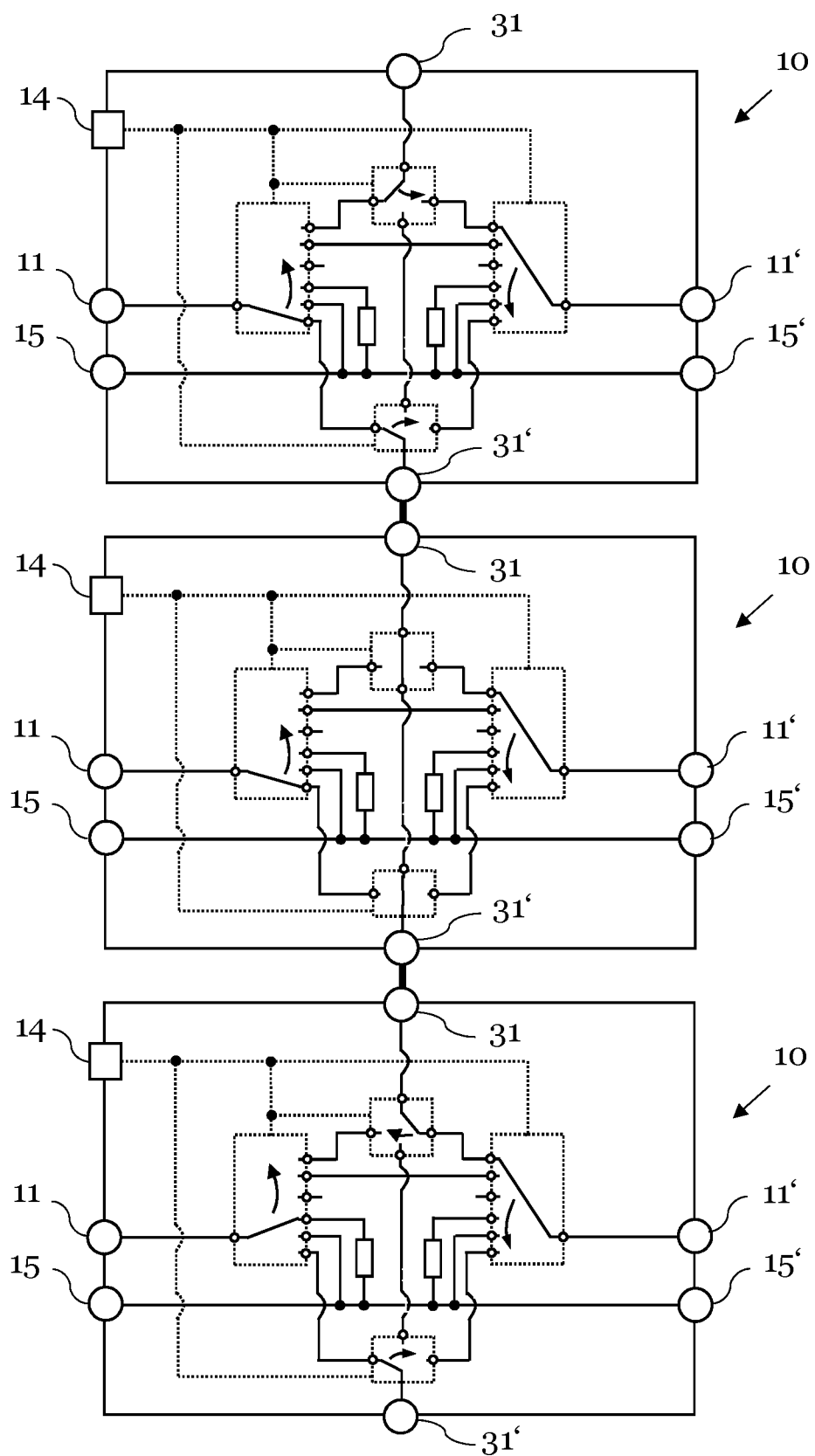
FIG. 12 shows a schematic diagram of a calibration system according to an embodiment.
Figure 13:
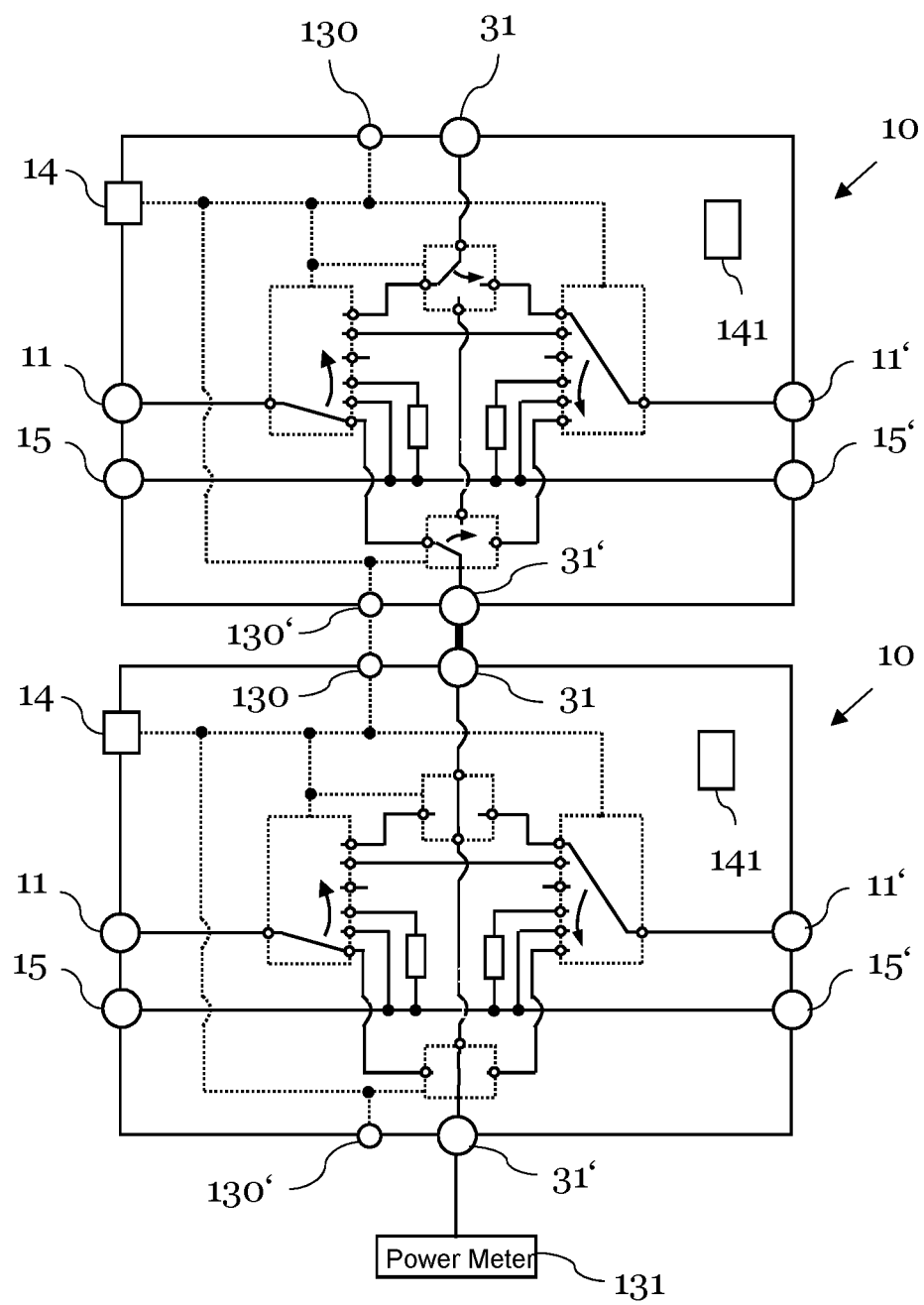
FIG. 13 shows a schematic diagram of a calibration system according to an embodiment.

Thus, with the daisy chain ports 31, 31' any external signal path from another calibration unit can be connect to either of the two ports 11, 11' of the calibration unit 10 or be routed through to the respective other daisy chain ports. In this way, easy cascading of calibration units 10 is possible by connecting two or more calibration units by cables via the daisy chain ports 31, 31', as can be seen in FIGS. 12 and 13. The daisy chain ports 31, 31' can thereby form or be comprised by external connectors of the calibration unit 10.

The daisy chain port 31 and/or the further daisy chain port 31' can be designed as RF ports, e.g., for connecting a coaxial cable.

Figure 11:
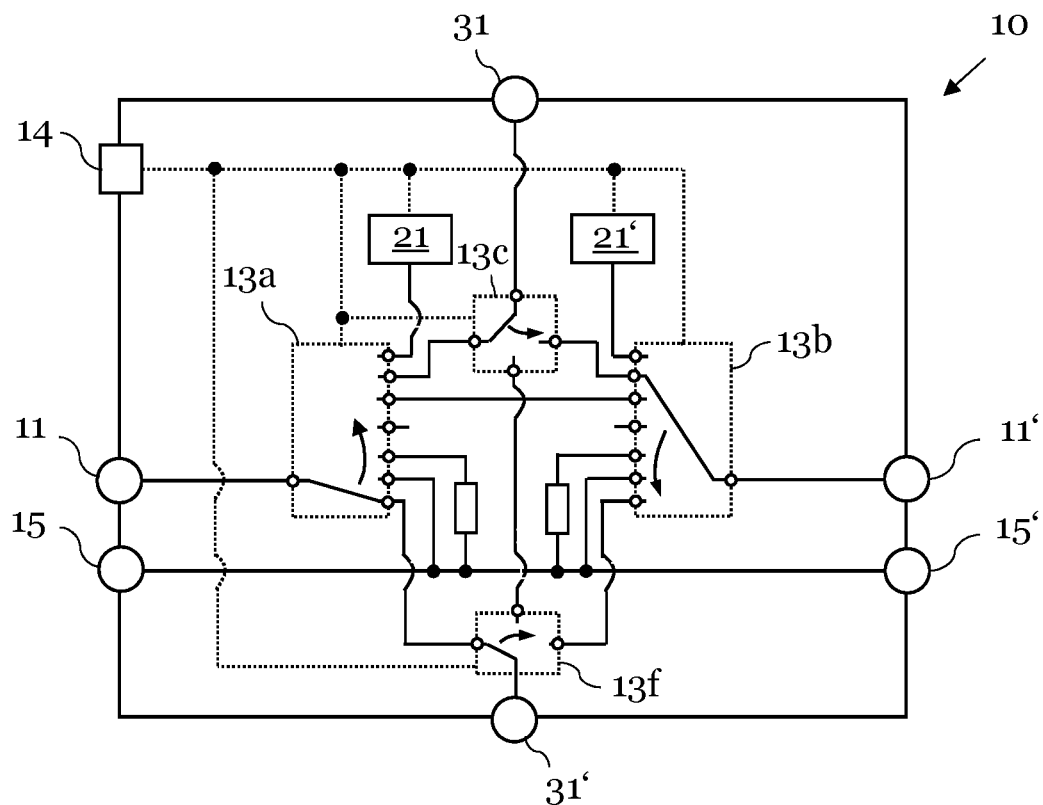
FIG. 11 shows a schematic diagram of a calibration unit according to an embodiment.

FIG. 11 shows a schematic diagram of a calibration unit 10 according to an embodiment.

The exemplary embodiment of the calibration unit 10 shown in FIG. 11 is similar to the example in FIG. 5 or 6, wherein the calibration unit 10 in FIG. 11 comprises two internal power meters 21, 21'.

The first internal power meter 21 can be connected to the first port 11 and the second internal power meter 21' can be connected to the second port 11', in particular by means of switches 13a, 13b of the switching module 13. In principle, it is also possible that the control unit comprises only one internal power meter 21 which is connectable to the first and the second port 11, 11' via an additional switch.

FIG. 12 shows a schematic diagram of a calibration system according to an embodiment. The calibration system is formed by three calibration units 10, however any number of calibration units 10 is possible. For instance, the three calibration units 10 can be calibration units 10 as shown in FIG. 10 or 11.

The calibration units 10 in FIG. 12 are connected via their respective daisy chain ports 31, 31'. In this way, any first or second port 11, 11' (e.g., input ports) of a calibration unit can be connected to any first or second port 11, 11' of another calibration unit 10. This allows to establish any through connection that can be switched for calibration. In this way, several calibration units 10 can be connected to a compound or a network and can be used together for calibrating one or more ports 17 of a measurement device 16 (or of several measurement devices).

By cascading multiple calibration units 10, as shown in FIG. 12, the number of ports 11, 11' for connecting a measurement device can be increased. For example, two 2-port calibration units 10 form a 4-port calibration system; five 2-port calibration units form a 10-port calibration system.

FIG. 13 shows a schematic diagram of a calibration system 10 according to an embodiment. The calibration system is formed by two calibration units 10, however any number of calibration units 10 is possible.

The calibration units 10 of the system shown in FIG. 13 comprise additional data connection ports 130, 130' (i.e., second data connection ports 130, 130').

The additional data connection ports 130, 130' can be arranged to establish a data connection between all calibration units 10 of the system via an additional daisy chain connection between the units 10. For instance, it can be sufficient that only one of the inter-connected calibration units of the system is connected to the measurement device via its data connection port 14 (e.g., via USB connection).

In particular, an energy supply to the calibration units 10 can be supplied, respectively forwarded, via the data connection ports 130, 130'.

In particular, at least one of the calibration units 10 can receive the power supply via the first data connection port 14 or via a separate power connector.

Furthermore, the calibration units 10 that are daisy-chained via the data connection ports 130, 130' can be automatically detected, e.g., by the connected measurement device 16. In this way, the measurement device 16 can know which calibration unit is connected to which other calibration unit 10.

For calibration, the measurement device 16 can display an instruction which cable is to be connected to which port 11, 11' of a calibration unit 10 and to which port 17 of the measurement device 16. A user can confirm each established connection, prompting the measurement device to display the next connection to be established.

Each of the calibration units 10 can further comprise a plurality of indicators 141, for instance LEDs and/or a display. The display can show a number of the respective calibration unit 10 in the system, e.g., a stack of calibration units 10. The LEDs can indicate which port of a calibration unit 10 should be connected to the measurement device 16 or with a DUT next.

The first or the last of the daisy chain port 31, 31' in a stack of calibration units 10 can be connected to an external power meter 131. In this way, each first or second port 11, 11' (i.e., each input port) of each calibration unit 10 can be connected to the external power meter 131.

In particular, by means of the daisy chain ports 31, 31', any port of any calibration unit 10 can be connected to any port of any other calibration unit 10 to allow an "Unknown Through" calibration measurement, e.g., for performing an UOSM calibration of a port of the measurement device. All signal paths are preferably reciprocal so that the path is a valid "Unknown Through". Furthermore, any one-port calibration measurements with the connected calibration units 10 can identical to a calibration carried out by a standalone calibration unit. In particular, neither are the S-parameter data for the characterization of the different one-port calibration standards different nor are additional characterization data needed on the calibration unit 10. For a cascaded calibration unit setup, as shown in FIGS. 12 and 13, the switching of the calibration units 10 is controlled by the measurement device 16 so that the signal paths are correct. Neither the calibration units 10 nor the controlling device 16 (e.g., a VNA instrument) require special handling of the characterization data of the calibration standards because of the cascaded setup. However, preferably the port mapping of ports of the different calibration units 10 should be known.

For instance, the switches in FIG. 12 are set such that an unknown through calibration measurement for a UOSM calibration between the first port 11 of the top calibration unit (CalUnit 1) and the first port 11 of the bottom calibration unit (CalUnit 3) can be made.

Figure 14:
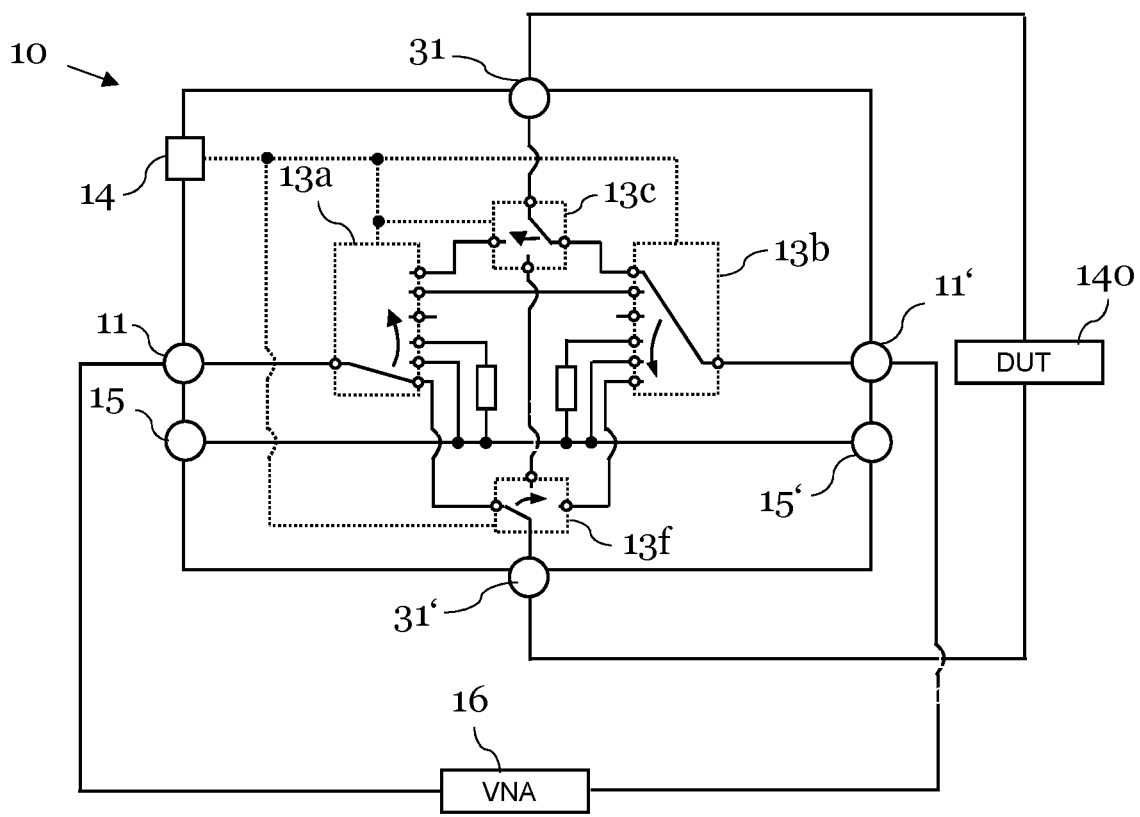
FIG. 14 shows a schematic diagram of a calibration unit which is connected to a measurement device and a DUT according to an embodiment.

FIG. 14 shows a schematic diagram of the calibration unit 10 according to an embodiment.

The calibration unit 10 in FIG. 14 is used as an inline calibration unit, wherein a DUT 140 is connected to the respective daisy chain ports 31, 31' and the measurement device 16 (e.g., a VNA) is connected to the first and second port 11, 11'. In this way, the VNA can be calibrated while being connected to the DUT (via the calibration unit 10). The switches 13a, 13b, 13c, 13e of the switching module can be controlled to selectively connect the connected ports of the measurement device 16 either to the calibration standards or to the DUT 140.

Furthermore, the calibration unit 10 can comprise an additional internal power meter (not shown).

Figure 15:
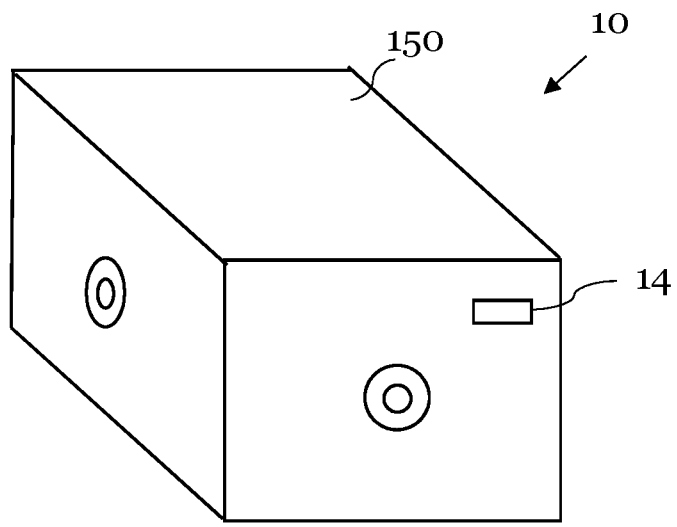
FIG. 15 shows a schematic diagram of a calibration unit according to an embodiment.

FIG. 15 shows a schematic diagram of the calibration unit 10 according to an embodiment. The calibration unit 10 comprises a housing 150 or enclosure.

Preferably, the calibration unit 10 is temperature-controlled. For instance, the calibration unit 10 can comprise heating or cooling elements (e.g., Peltier elements).

The round ports visible on the front side and the left side of the housing 150 can be coaxial RF connectors and can comprise the first or second port 11, 11' and the respective ground ports 15, 15'. The round ports can also form the first or second daisy chain port 31, 31'.

Figure 16:
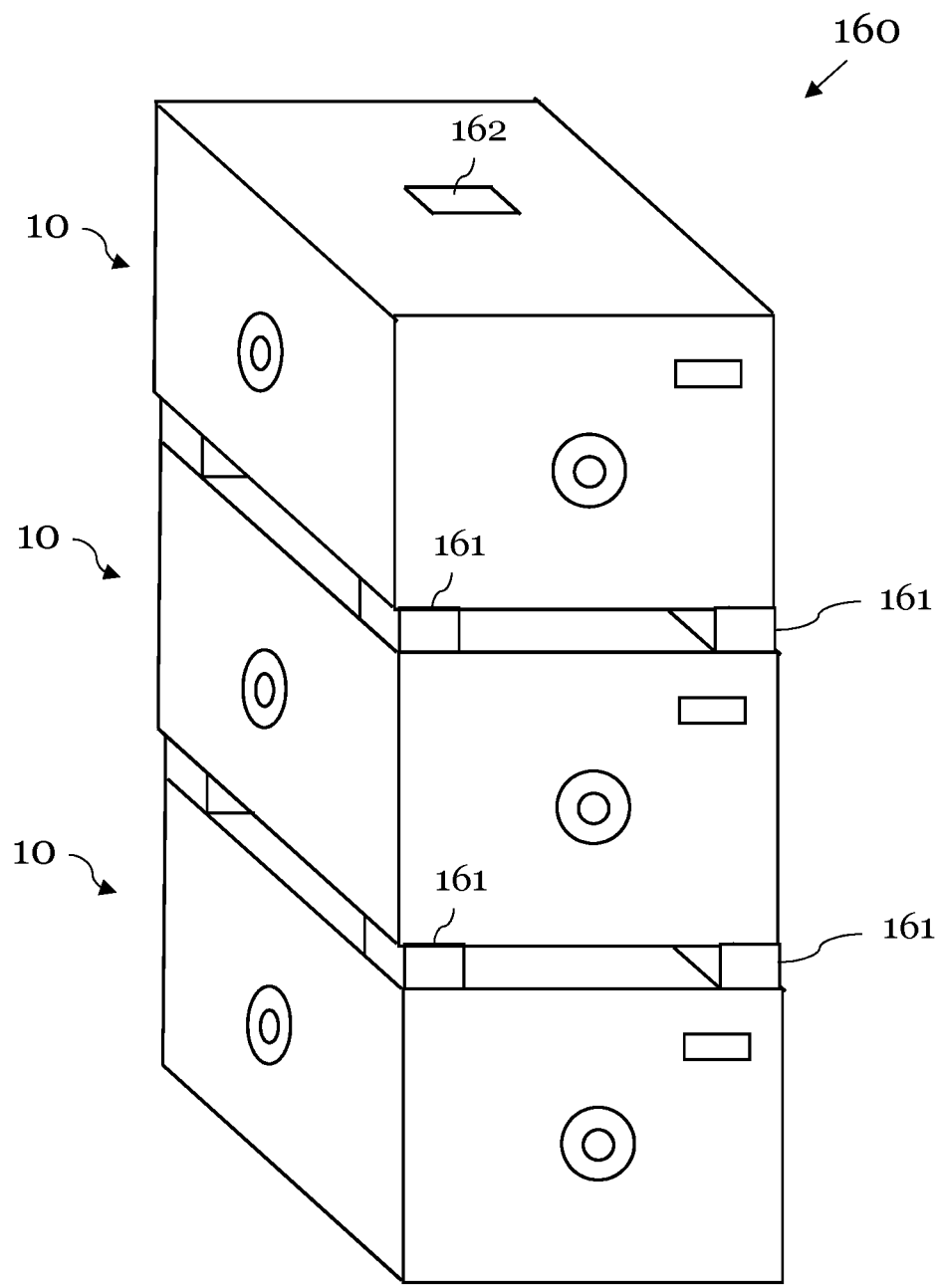
FIG. 16 shows a schematic diagram of a calibration system according to an embodiment.

FIG. 16 shows a schematic diagram of the calibration system 160 according to an embodiment. The calibration system 160 thereby comprises stacked calibration units 10, e.g., according to FIG. 15.

A data connection between these stacked calibration units 10 can be established via stack connections 162 between the individual calibration units. Thereby, the stack connections 162 of two calibration units 10 can be arranged to engage with each other when the calibration units 10 are stacked on top of each other. The stack connection 162 is schematically shown by a rectangular socket on the top side of the top unit 10 in FIG. 16. Another stack connection 162 can be arranged on a bottom side of each unit 10.

The stack connections 162 can form the data connection ports 130, 130' for establishing the data connection between the calibration units 10.

The stacked calibration units 10 can be connected via fastening connections 161. The fastening connections 161 can be arranged on the housing of the calibration units 10. The fastening connections 161 can comprise mechanical holders which are part of the calibration units 10 so that one calibration unit 10 can easily be attached to another calibration unit 10. Other mounting mechanisms are possible.

The fastening connections 161 can form a mechanical mounting system which does not worsen the stability of a calibration unit 10 if it is not connected to other units 10 but enhances the stability of stacked or cascaded calibration units 10.

For instance, the fastening connections 161 can comprise mounting rails to enable a sliding mounting mechanism for easy stacking of the calibration units 10.

Figure 17:
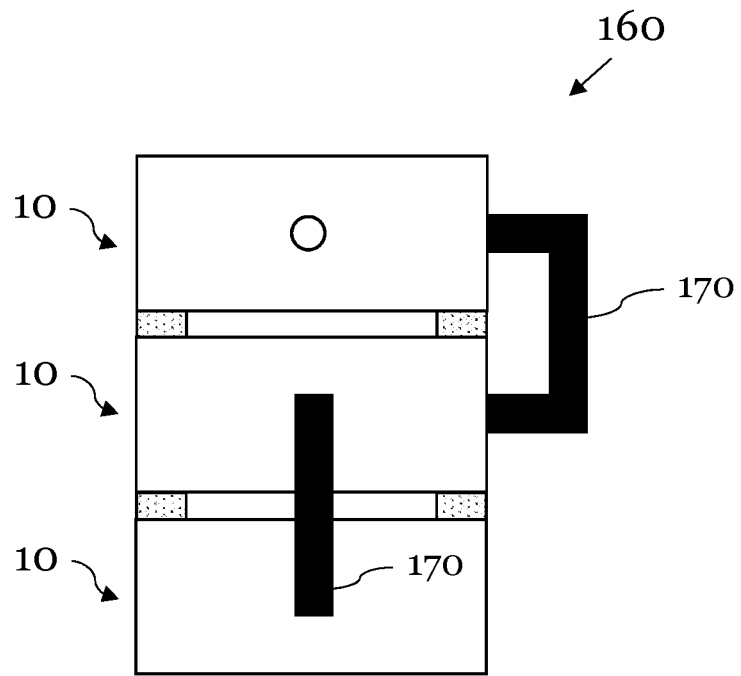
FIG. 17 shows a schematic diagram of a calibration system according to an embodiment.

FIG. 17 shows a schematic diagram of the system 160 according to an embodiment. Thereby, RF brackets 170 are used to connect the daisy chain ports 31, 31' of the stacked calibration units 10. Instead of the RF brackets 170, cables could also be used.

Figure 18:
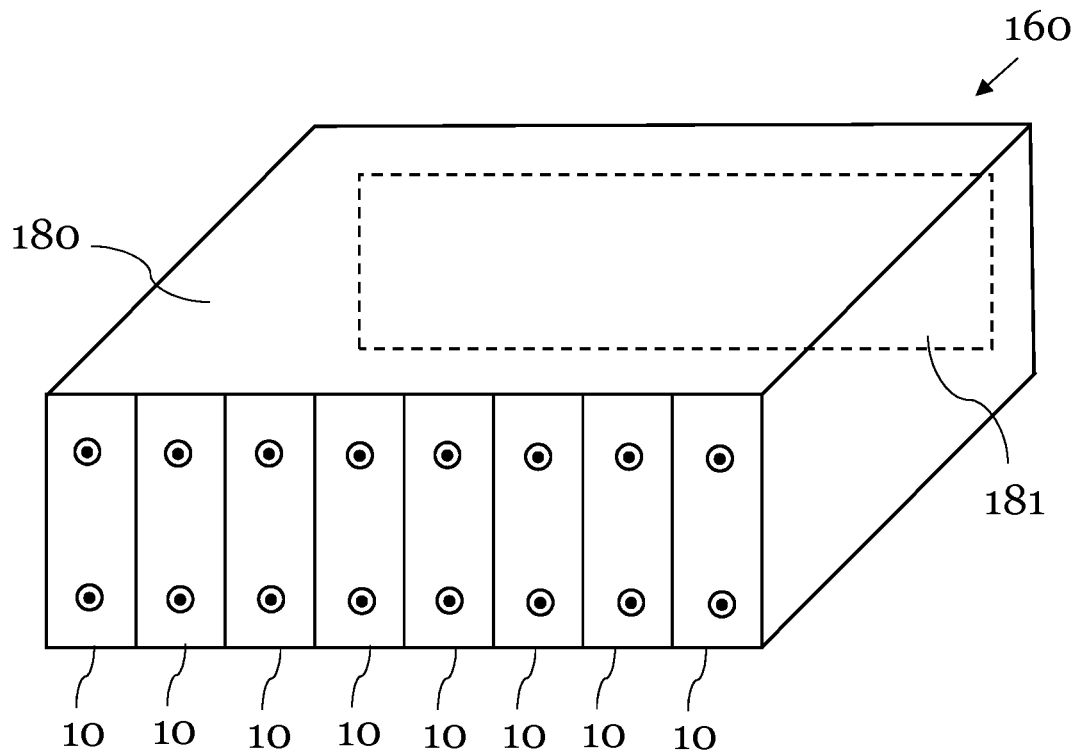
FIG. 18 shows a schematic diagram of a calibration system according to an embodiment.

FIG. 18 shows a schematic diagram of the system 160 according to an embodiment. The calibration units 10 are thereby inserted in a rack module. For instance, the calibration units 10 are horizontally stacked in the rack module.

The rack module comprises a common enclosure 180. The daisy chain ports 31, 31' and the data connection ports 130, 130' of each calibration unit 10 can be arranged on a backside and, thus, are not visible from the front side.

The measurement device 16 and/or the DUT 140 can be connected to the ports on the front side of the rack module which are visible in FIG. 18 (e.g., the first and second ports 11, 11' of the units 10). These ports are easy and convenient to reach.

The system 160 can further comprise a backplane 181 which is connected to the calibration units. In particular, the backplane 181 is connected to the ports on the backside of the calibration units 10 when they are inserted in the rack, e.g. via plug connections. The backplane can also connect the daisy chain ports 31, 31' on the backside of the calibration unit, e.g. via RF brackets or other connectors.

Furthermore, the backplane can provide a power supply and/or data connection to the calibration units 10.

The backplane 181 can be arranged in the common enclosure.

All features described above or features shown in the figures can be combined with each other in any advantageous manner within the scope of the invention.

The invention claimed is:

1. A calibration unit for calibrating a measurement device, such as a network analyzer, comprising:
    a first port which is arranged for being connected to the measurement device;
    a calibration module comprising at least three different calibration standards for calibrating the measurement device; and
    a switching module configured to connect the first port with one of the at least three different calibration standards of the calibration module;
    wherein the calibration unit further comprises at least one of:
        a daisy chain port which is arranged for being connected to a further calibration unit, to an external power meter, or to a device-under-test, (DUT) wherein the first port is connectable to the daisy chain port;
        an internal power meter which is arranged within a housing of the calibration unit, wherein the first port is connectable to the internal power meter; or
        an internal impedance tuner which is arranged within a housing of the calibration unit, wherein the first port is connectable to the internal impedance tuner,
    wherein the internal impedance tuner comprises an electrical line structure and a plurality of switches, especially in the form of transistors, which are arranged at different positions along the electrical line structure,
    wherein each switch is configured to connect the respective position of the electrical line structure to ground in order to tune the internal impedance tuner to a specific impedance, and
    wherein a matched load is arranged at one end of the line structure.

2. The calibration unit of claim 1,
    wherein the switching module is configured to connect the first port to the daisy chain port and/or the internal power meter and/or to the internal impedance tuner.

3. The calibration unit of claim 1,
    wherein the switching module comprises n switches and/or switching stages, wherein n is larger or equal to 1, 2, 3, 4, 5, 6, 7, 8, or 9.

4. The calibration unit of claim 1,
    wherein a first switch or a first switching stage of the switching module is configured to connect the first port with one of the at least three different calibration standards of the calibration module; and/or
    wherein the first switch or the first switching stage is configured to connect the first port to a second switch or a second switching stage of the switching module, wherein the second switch or the second switching stage is configured to establish a connection to the daisy chain port and/or to the internal power meter and/or to the internal impedance tuner.

5. The calibration unit of claim 1, further comprising:
    a plurality of indicators, which are configured:
    to indicate which device or cable should be connected to at least one port of the calibration unit, and/or
    to indicate a number or position of the calibration unit in a system comprising a plurality of calibration units.

6. The calibration unit of claim 1, further comprising:
    at least one fastening connection for connecting the calibration unit to a further calibration unit.

7. The calibration unit of claim 1, further comprising:
    a second port which is arranged for being connected to the measurement device or a further measurement device.

8. The calibration unit of claim 7, further comprising:
    a further calibration module comprising at least three different calibration standards for calibrating the measurement device or the further measurement device;
    wherein the switching module is configured to connect the second port with one of the at least three different calibration standards of the further calibration module.

9. The calibration unit of claim 7,
    wherein the switching module is configured to connect the second port to the daisy chain port, and/or the internal power meter or another internal power meter, and/or the internal impedance tuner or another internal impedance tuner.

10. The calibration unit of claim 7,
wherein the switching module is configured to connect the first port to the second port thereby establishing a through connection.

11. The calibration unit of claim 10, further comprising:
an additional switch of the switching module and/or at least one attenuator which are arranged along the through connection,
wherein the additional switch of the switching module can be used for interrupting the through connection thereby increasing isolation between the first port and the second port, and/or wherein the at least one attenuator can be used for increasing an attenuation of signals in the through connection thereby increasing the isolation between the first and the second port.

12. The calibration unit of claim 1, comprising:
a further daisy chain port which is arranged for being connected to a further calibration unit, an external power meter or a DUT.

13. The calibration unit of claim 12,
wherein the switching module is configured to connect the daisy chain port to the further daisy chain port.

14. The calibration unit of claim 12,
wherein the switching module is configured to connect the first port and/or a second port to the further daisy chain port.

15. A calibration system, comprising:
a plurality of calibration units of claim 1;
wherein each of the plurality of calibration units comprises two daisy chain ports;
wherein the calibration units are connected to each other in a serial manner via the respective daisy chain ports; and
wherein the calibration units are stacked horizontally or vertically and/or are arranged in a common enclosure.

16. The calibration system of claim 15, further comprising:
wherein, if the plurality of calibration units is arranged in a common enclosure, the system comprises a backplane which is connected to the plurality of calibration units and which is configured to provide a power supply to each of the plurality of calibration units.

17. A calibration unit for calibrating a measurement device, such as a network analyzer, comprising:
a first port which is arranged for being connected to the measurement device;
a calibration module comprising at least three different calibration standards for calibrating the measurement device;
a switching module configured to connect the first port with one of the at least three different calibration standards of the calibration module:
a first data connection port which is arranged to establish a data connection between the calibration unit and the measurement device; and
at least a second data connection port which is configured to daisy-chain the data connection to at least a further calibration unit,
wherein the calibration unit further comprises at least one of:
a daisy chain port which is arranged for being connected to a further calibration unit, to an external power meter, or to a device-under-test, DUT, wherein the first port is connectable to the daisy chain port;
an internal power meter which is arranged within a housing of the calibration unit, wherein the first port is connectable to the internal power meter; or
an internal impedance tuner which is arranged within a housing of the calibration unit,
wherein the first port is connectable to the internal impedance tuner,
wherein the switching module is controllable through the data connection, and/or the internal impedance tuner is controllable through the data connection, and/or measurement data of the internal power meter is transmitted via the data connection to the measurement device,
wherein the second data connection port is arranged on the housing of the calibration unit, such that a physical connection with a respective data connection port of the further calibration unit is established if the calibration unit and the further calibration unit are stacked on top of each other.

18. The calibration unit of claim 17,
wherein the calibration unit is configured to receive a power supply via the first data connection port or via a separate power connector of the calibration unit.

\* \* \* \* \*